United States Patent [19]
Christensen et al.

[11] 3,912,743

[45] Oct. 14, 1975

[54] 4-PHENYLPIPERIDINE COMPOUNDS

[75] Inventors: Jorgen Anders Christensen, Virum; Richard Felt Squires, Gl. Olstykke, both of Denmark

[73] Assignee: A/S Ferrosan, Denmark

[22] Filed: Jan. 21, 1974

[21] Appl. No.: 435,006

[30] Foreign Application Priority Data
Jan. 30, 1973 United Kingdom................. 4496/73

[52] U.S. Cl. .................. 260/293.58; 260/293.73; 260/293.81; 260/293.83; 260/293.84; 424/267

[51] Int. Cl.² ........................................ C07D 211/22

[58] Field of Search................... 260/293.58, 293.83

[56] References Cited
UNITED STATES PATENTS
| | | | |
|---|---|---|---|
| 2,976,291 | 3/1961 | Jacob et al...................... | 260/294.7 |
| 3,178,438 | 4/1965 | Clarke ............................ | 260/294.7 |

*Primary Examiner*—G. Thomas Todd
*Attorney, Agent, or Firm*—Wenderoth, Lind & Ponack

[57] ABSTRACT

The invention relates to new 3-substituted 1-alkyl-4-phenylpiperidines, being useful as antidepressant and anti-Parkinson agents, and to their production.

8 Claims, No Drawings

4-PHENYLPIPERIDINE COMPOUNDS

The present invention relates to novel 4-phenylpiperidine compounds and their salts with pharmaceutically acceptable acids, that are useful as pharmacological agents and to means for their production.

More particularly the invention relates to 3-substituted 1-alkyl-4-phenylpiperidine compounds having the general formula:

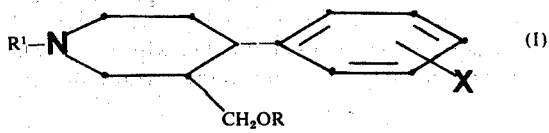

wherein R represents an alkyl or alkynyl group having 1–4 carbon atoms, or a phenyl group optionally substituted by lower alkyl, alkylthio, alkoxy, halogen, nitro, acylamino, methylsulfonyl, methylenedioxy, or tetrahydronaphthyl, $R^1$ represents alkyl or alkynyl, and X represents hydrogen, alkyl having 1–4 carbon atoms, alkoxy, trifluoroalkyl, hydroxy, halogen, methylthio, or aralkyloxy.

Where not otherwise specified, the alkyl, alkynyl, and acyl groups are preferably having 1–4 carbon atoms. The aromatic part of the aralkoxy group is preferably unsubstituted phenyl.

Examples of alkyl groups are methyl, ethyl, propyl, isopropyl, n-butyl, and tert.butyl, also as parts of the alkoxy and alkylthio groups.

Examples of alkynyl groups are ethynyl, propynyl, and butynyl groups.

Examples of halogens are chlorine, bromine, and fluorine.

Examples of acylamino groups are acetylamino, propylamino, and butylamino.

The salt forming acids may be any of the available, pharmaceutically acceptable acids.

The compounds of this invention have interesting pharmacological properties which make them useful as antidepressants and anti-Parkinson agents. The compounds, wherein R is phenyl, 4-methoxyphenyl, and 1,3-benzdioxylyl, have proved particularly valuable in the said respects.

The compounds of formula I are prepared from the corresponding carbinols which can be prepared by reducing a compound of the formula II

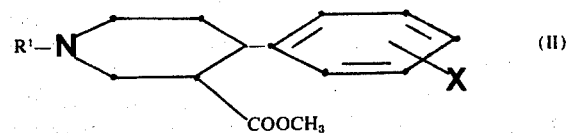

where $R^1$ and X are as hereinbefore defined, preferably with a complex metal hydride reducing agent, especially lithium aluminium hydride.

Compounds having the formula II may be prepared according to J. T. Plati, A. K. Ingberman and W. Wenner (J.Org.Chem. 1957: 22, 201) who prepare the compound in which X is hydrogen and $R^1$ is methyl by treating arecoline (methyl-1,2,5,6-tetrahydro-3-pyridine-carboxylate) with phenyl magnesium bromide.

In the same manner, other compounds used as starting material for the desired piperidine carbinols are prepared using the appropriate arecoline homologue and X-phenyl magnesium bromide. The reaction gives the two isomers, the cis form ($\alpha$) and the trans form ($\beta$) (carbon atoms 3 and 4 in the piperidine ring). Both forms can again be resolved into a (+) and a (−) form.

The compounds of the invention may be prepared from the piperidine carbinols using different processes.

Method A

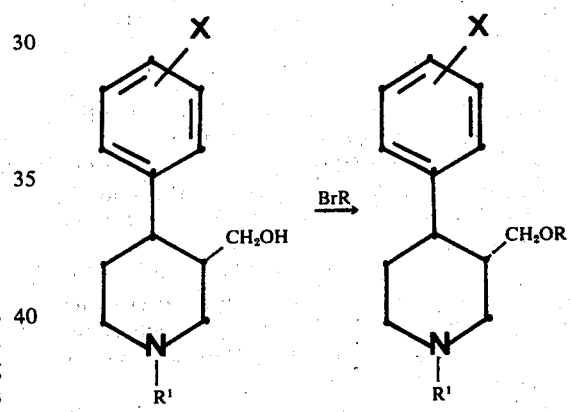

The alkali metal compound of the piperidine carbinol is treated with an active ester corresponding to the desired R substituent.

Method B

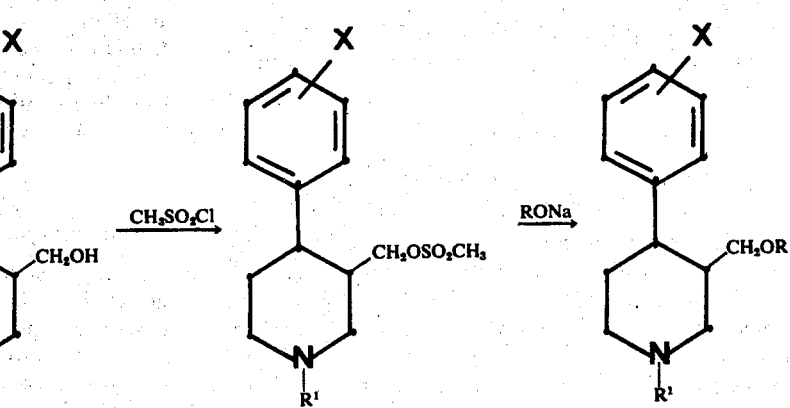

The piperidine carbinol is converted into an ester, e.g. the methane sulfonic ester, using methane sulfochloride in pyridine, and reacting with RONa, R being as above.

Using method A, the α-form of the carbinol gives the α-form of the ether, whereas the β-form of the carbinol gives the β-form of the ether.

Using method B, the α-form of the carbinol gives the α-form of the ether, but surprisingly the β-form of the carbinol gives a mixture of the α-form and the β-form, mainly the α-form.

Method C

Two hydroxy compounds are condensed using dicyclohexylcarbodiimide as a condensing agent:

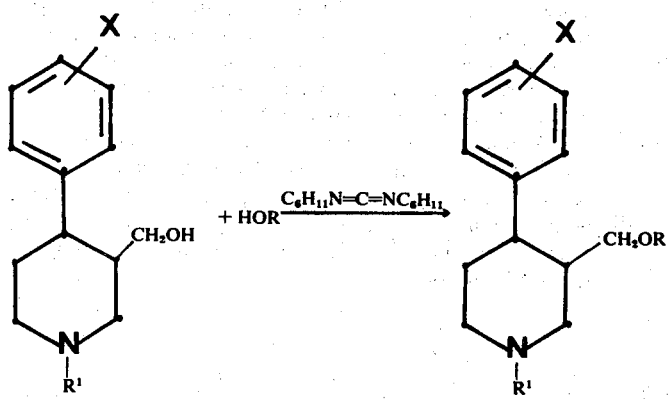

In this method the α-carbinols give α-ethers, and the β-carbinols give a mixture of α- and β-ethers.

According to another method the compounds of the invention are prepared from compounds of formula I, wherein R and X are as defined previously, and $R^1$ in this case is hydrogen or an acyl group.

If $R^1$ is hydrogen, the compound is alkylated, and if $R^1$ is an acyl group, the group is reduced to give the corresponding alkyl group, or the acyl group is removed by hydrolyzing to leave the NH group which is then alkylated.

Usually one of the optical active forms of the new compounds is therapeutically more active than the other. To isolate this form the resolution may be accomplished as described in Example 3, or the resolution may be accomplished at an earlier stage, before the carbinol group of the piperidine is converted to an ether group.

The following Examples are illustrative of the compounds of the invention and their preparation without being limiting.

EXAMPLE 1

3-((4-Methoxyphenoxy)-methyl)-1-methyl-4-phenylpiperidine hydrochloride a. Methane sulfochloride (55.5 g) was added dropwise to a solution of 3-hydroxymethyl-1-methyl-4-phenylpiperidine (88.8 g) in dry pyridine (300 ml), the temperature being kept between 10° and 15°C, and the mixture being stirred for 1 hour. The reaction mixture was poured into a mixture of sodium hydroxide (15 g), water (500 ml), ice (500 g), and ether (400 ml). The ether layer was separated, and the aqueous layer was extracted with ether. The ether extracts were added to the ether layer, washed with water and dried over potassium carbonate. Removal of the solvent in vacuo (maximum 25°C) gave the methanesulfonic acid ester as an oil. Yield 120 g.

b. To a solution of sodium (17.5 g) in dry methanol (210 ml) was added a solution of 4-methoxyphenol (87.5 g) in methanol (140 ml) and a solution of the methanesulfonic ester of 3-hydroxymethyl-1-methyl-4-phenylpiperidine (105 g) in methanol (200 ml). The mixture was stirred and refluxed for 16 hours. After removal of the solvent in vacuo, the evaporation residue was poured into a mixture of ice (150 g), water (150 ml), and ether (200 ml). The ether layer was separated, and the aqueous layer was extracted with ether. The combined ether solutions were washed with water and agitated with 2N hydrochloric acid (200 ml) to give a crystalline precipitate which was dried. Yield 56.8 g. M.p. 236°–239°C.

Recrystallization from 97% ethanol gave 52.3 g of 3-((4-methoxyphenoxy)-methyl)-1-methyl-4-phenylpiperidine hydrochloride, m.p. 237°–239°C.

EXAMPLE 2

3-Methoxymethyl-1-methyl-4-phenylpiperidine

To a solution of sodium (15.2 g) in methanol (270 ml) was added a solution of the methanesulfonic acid ester of 3-hydroxymethyl-1-methyl-4-phenylpiperidine (121 g) in methanol (270 ml). The mixture was stirred and refluxed for 16 hours. The solvent was removed in vacuo, and the evaporation residue was poured into ice-water. The mixture was extracted with ether, the ether extract was dried over potassium carbonate, and the ether was evaporated. The evaporaton residue was distilled in vacuo to give 66 g of 3-methoxymethyl-1-methyl-4-phenylpiperidine. B.p. 0.05 mm: 78°–81°C. The hydrochloride of this compound has m.p. 151°–154°C, and the hydrobromide has m.p. 158°C.

EXAMPLE 3

Resolution of racemic 3-methoxymethyl-1-methyl-1-4-phenylpiperidine a. To a solution of (−)dibenzoyltartaric acid (7.1 g) in 99% ethanol (75 ml) was added (±)e-methoxymethyl-1-methyl-4-phenylpiperidine (8.8 g). After evaporation of the solvent the evaporation residue was recrystallized from benzene (80 ml) to give 5 g of the dibenzoyltartrate, m.p. 152–154°C. This was dissolved in a mixture of 4N sodium hydroxyde (10 ml) and ether (20 ml), and the ether layer was separated, dried over potassium carbonate, and evaporated to dryness. The evaporation residue was treated with hydrobromic acid, the water removed in vacuo, and the residue recrystallized from ethanol and ether to yield the hydrobromide, m.p. 178–180°C. $[\alpha]_{25}^{D} = +36$ ($c = 7\%$ in 99% ethanol).

b. The benzene from the recrystallization mentioned under (a) above was evaporated, and the evaporation residue dissolved in a mixture of 4N sodium hydroxyde (20 ml) and ether (20 ml). The ether layer was separated, dried over potassium carbonate, and evaporated. The residue (4.6 g) was added to a solution of (+)dibenzoyltartaric acid (3.7 g) in 99% ethanol (40 ml), whereupon the procedure was as described under a). The hydrobromide has m.p. 179°–180°C, and $[\alpha]_{25}^{D} = -37$ ($c = 7\%$ in 99% ethanol).

EXAMPLE 4

($\alpha$)-3-Methoxymethyl-1-methyl-4-phenylpiperidine ($\alpha$)-3-hydroxymethyl-1-methyl-4-phenylpiperidine (6.15 g) was added to a suspension of sodium hydride (1.6 g), (50% in oil) in dry dimethylformamide. The mixture was stirred, and a solution of methylbromide (2.85 g) in dimethylformamide (10 ml) was slowly added, the stirring being continued for 16 hours at 25°C. 40 ml of water were added, and the reaction mixture was extracted 5 times with methylene chloride (25 ml). The combined methylene chloride extracts were extracted with 0.5N hydrochloric acid, and the extract was made alkaline with 4N sodium hydroxyde (10 ml) and extracted with ether. The ether extract was dried over potassium carbonate, the ether was removed by distillation, and the residue was distilled in vacuo to yield 4 g of ($\alpha$)-3-methoxymethyl-1-methyl-4-phenylpiperidine, b.p. 72°–74°C (0.05 mm).

With hydrobromic acid, the hydrobromide was prepared, m.p. 158°–160°C.

EXAMPLE 5

($\beta$)-3-Methoxymethyl-1-methyl-4-phenylpiperidine hydrobromide

The procedure described in Example 4 was followed except that the ($\beta$)-3-hydroxymethyl compound was used instead of the ($\alpha$) compound.

The hydrobromide obtained had m.p. 201–204°C.

EXAMPLE 6

A mixture of 16.5 g of $\alpha$-3-hydroxymethyl-1-methyl-4-phenylpiperidine, 12.5 g of 4-methoxyphenol and 16.5 g of dicyclohexylcarbodiimide was heated to 160°–180°C for 24 hours. After cooling, 200 ml of ether were added to dissolve the product. The separated dicyclohexylurea was removed by tiltration, and the solution was extracted with 200 ml of 0.5N hydrochloric acid. From the acid solution, the hydrochloride of the $\alpha$-compound was prepared in the usual way.

EXAMPLES 7–67

Using one or the other of the methods described in Examples 1–6, the compounds listed below were prepared:

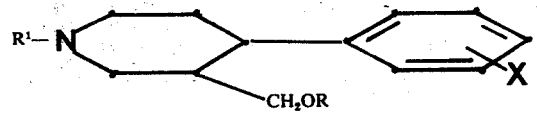

| | | $\alpha$ - forms | $R^1$ = Methyl | |
|---|---|---|---|---|
| Code | R | X | M.p. (°C) | Salt |
| GF 01 | Methyl | H | 151–154 | HCl |
| | | | 160–166 | HBr |
| | | racemic form | 179–180 | HBr |
| GF 02 | Ethyl | H | 169–171 | HCl |
| GF 03 | Methyl | 2-Methyl | 189–190 | HBr |
| GF 04 | Methyl | 4-Fluor | 123–130 | HBr |
| GF 05 | Methyl | 2-Methoxy | 171–174 | HBr |
| GF 06 | Methyl | 3-Trifluormethyl | 92–94 | maleate |
| | | racemic form | 129–131 | HBr |
| GF 07 | Methyl | 4-tert.butyl | 143–145 | maleate |
| GF 08 | Methyl | 3-Methoxy | 100–102 | maleate |
| GF 09 | Methyl | 4-Chloro | 104–105 | maleate |
| GF 10 | 2-Propyl | H | 179–181 | HCl |
| GF 11 | Methyl | 3-Hydroxy | 222–223 | HCl |
| GF 12 | Methyl | 4-Methoxy | 103–104 | maleate |
| GF 13 | Methyl | 4-Hydroxy | 230–233 | HCl |
| GF 14 | t.-Butyl | H | 195–197 | HBr |
| GF 15 | Phenyl | H | 220–223 | HBr |
| GF 16 | 4-Chlorophenyl | H | 199–202 | HBr |
| GF 17 | 4-Methoxyphenyl | H | 234–235 | HBr |
| GF 18 | 2-Methoxyphenyl | H | 164–166 | HBr |
| GF 19 | 3-Methoxyphenyl | H | 176–179 | HBr |
| GF 20 | 4-Ethoxyphenyl | H | 185–187 | HBr |
| GF 21 | 3,5-Dimethoxyphenyl | H | 166–169 | HBr |
| GF 22 | Methyl | 4-Bromo | 249–250 | HBr |
| GF 23 | 4-Methoxyphenyl | 4-Methoxy | 211–212 | HCl |
| GF 24 | Phenyl | 4-fluoro | 203–206 | HCl |
| GF 25 | Phenyl | 4-Methoxy | 213–215 | HCl |
| GF 26 | 4-Methoxyphenyl | 4-Fluoro | 227–230 | HCl |
| GF 27 | Phenyl | 4-Chloro | 201–203 | HCl |
| GF 28 | 4-Methoxyphenyl | 4-Chloro | 217–219 | HCl |
| GF 29 | 4-Methylsulfonylphenyl | H | 146–148 | HCl |
| GF 30 | 4-Methylthiophenyl | H | 210–212 | HCl |
| GF 31 | 4-Methoxyphenyl | H (−)form | 190–192 | HCl |
| GF 32 | 4-Methoxyphenyl | H (+)form | 191–193 | HCl |
| GF 33 | Phenyl | 4-Methylthio | 222–226 | HCl |
| GF 34 | 4-Methoxyphenyl | 4-Methylthio | 240–242 | HCl |

—Continued

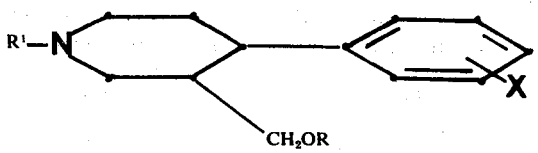

|  |  | α - forms | R¹ = Methyl |  |
|---|---|---|---|---|
| Code | R | X | M.p. (°C) | Salt |
| GF 35 | 4-Acetylaminophenyl | H | 243–247 | HCl |
| GF 36 | 4-Methoxyphenyl | H | 110–111 | (—CH₂COOH)₂ |
| GF 37 | 2-Propynyl | H | 121–131 | (=CHCOOH)₂ |
| GF 38 | 1,3-benzdioxolyl-(5) | H | 244–246 | HCl |
| GF 39 | 2-t.-Butylphenyl | H | 185–188 | HCl |
| GF 40 | 3,4-Dimethoxyphenyl | H | 230–233 | HCl |
| GF 48 | Phenyl | H (—) form | 173–174 | HBr |
| GF 49 | Phenyl | H (+)form | 173–174 | HBr |
| GF 50 | 4-Methoxyphenyl | 4-Hydroxy | 113–115 | HCl |
| GF 51 | 1,3-Benzdioxolyl-(5) | H (+)form | 217 | HCl |
| GF 52 | 1,3-Benzdioxolyl-(5) | H (—)form | 219 | HCl |
| GF 53 | (1,2,3,4-Tetrahydro-naphthyl-(3)) | H | 214–217 | HCl |
| GF 54 | 4-Methoxyphenyl | 4-Benzyloxy | 201–204 | HCl |
|  |  | R¹ = Propynyl |  |  |
| GF 41 | Methyl | H | 190–191 | HBr |
| GF 42 | 4-Methoxyphenyl | H | 170–172 | HCl |
|  |  | R¹ = H |  |  |
| GF 55 | 4-Methoxyphenyl | H (+)form | 141–142 | HCl |
| GF 56 | 4-Methoxyphenyl | H (—)form | 142–143 | HCl |
| GF 57 | 1,3-Benzdioxolyl-(5) | H (—)form | 181–182 | HCl |
| GF 58 | 1,3-Benzdioxolyl-(5) | H (+)form | 182–183 | HCl |
|  |  | R¹ = —CH₂GF₃ |  |  |
| GF 59 | 4-Methoxyphenyl | H (—)form | 123–128 | dec. HCl |
| GF 60 | 4-Methoxyphenyl | H (+)form | 116–120 | dec. HCl |
| GF 61 | 4-Methoxyphenyl | H racemic form | 142–143 | HBr |
| GF 43 | 4-Nitrophenyl | H | 219–224 | HBr |
| GF 44 | 3-Methyl | 4-Chloro | 225–228 | HBr |
| GF 45 | 3-Methyl | H | 201–203 | HBr |
| GF 46 | 4-Acetylaminophenyl | H | 258–262 | HCl |
| GF 47 | 4-Methoxyphenyl | H | 186 | HCl |

As stated hereinbefore, the compounds of formula I are useful as antidepressants and as anti-Parkinson drugs as indicated by their biochemical and pharmacological properties.

At present the antidepressants most used in the clinic are the tricyclic thymoleptics (e.g. Imipramine and Amitriptyline). These drugs act by centrally potentiating serotonin (5HT) and noradrenaline (NA) as a consequence of neuronal reuptake inhibition.

The same potentiating action of the new compounds was confirmed by determining 5HT- and NA-uptake inhibition in virtro using synaptosomes prepared from different regions of rat brain. Some of the compounds, e.g. GF 32, GF 52, and GF 57, are especially strong inhibitors of 5HT-uptake, while others, e.g. GF 48 and GF 49, are more potent NA-uptake inhibitors. Known tricyclic thymoleptics affect the cardiovascular and peripheral autonomic nervous systems causing a wide range of side-effects. Cardiac disturbances and varying degrees of hypotension occur rather frequently and may be very serious. Compounds according to this invention, e.g. GF 32, are more active 5HT potentiators than is Imipramine, but affect the cardiovascular system less than do the most common tricyclic thymoleptics, and therefore lack the more serious side-effects mentioned.

5HT-uptake inhibitory activity

Antagonism of p-chloroamphetamine (PCA)-induced 5HT-depletion from rat brain:

| Substance | 1) ED₅₀ mg/kg s.c. | 2) ED₅₀ mg/kg p.o. |
|---|---|---|
| GF 32 | 1.5 | 20 |
| GF 61 | 1.4 |  |
| GF 52 | 2.8 | 3.2 |
| GF 57 | 0.5 | 2.0 |
| Imipramine | 8.0 | 44 |
| Chlorimipramine | 1.0 | 42 |
| Amitriptyline | 12 |  |
| Protriptyline | >50 |  |

1) Test drugs were administered s.c. simultaneously with PCA.
2) Test drugs were administered 2 hours before PCA.

The method is described by Squires (Acta phamacol. et toxicol. 1972, 31 suppl. 1, 35).

In all experiments, GF 32 induced heart bundle branch block at a significantly higher dose level than did the tricyclic thymoleptics.

In dogs, the infusion produced an initial positive inotropic effect. GF 32 showed this property in the dose range 1–25 mg/kg, Imipramine and Amitriptyline at 1–6 mg/kg. Higher doses produced negative inotropic effects, No ECG changes were found in dogs during four weeks of daily administration of GF 32 in doses of 5 and 10 mg/kg.

Some of the new compounds, e.g. GF 15, GF 48, and GF 49, have shown a strong and selective inhibition of dopamine (DA) re-uptake indicating anti-Parkinson activity. Benztropine and some related anti-Parkinson drugs inhibit DA re-uptake, in addition to having strong anticholinergic effects, which may cause some of the most common adverse effects of these compounds. The compounds of this invention are almost devoid of anticholinergic effect.

Activity as dopamine-potentiators

Potentiation of apomorphine-induced gnawing in mice:

| Substance | ED$_{50}$ mg/kg s.c. | Maximal response |
|---|---|---|
| GF 14 | 7 | 139 |
| GF 15 | 28 | 224 |
| GF 48 | 43 | 126 |
| GF 49 | 27 | 221 |
| Benztropine | °5 | 52 |

The toxicity of the compounds of the invention is about the same as that of the tricyclic thymoleptics, but some compounds, e.g. GF 32, are less toxic.

| Substance | Acute toxicity in mice LD$_{50}$ mg/kg s.c. | LD$_{50}$ mg/kg p.o. |
|---|---|---|
| GF 53 | 941 | 1408 |
| GF 61 | 250 | 600 |
| GF 48 | 70 | 200 |
| GF 49 | 400 | 400 |
| GF 52 | 80 | 200 |
| GF 57 | 250 | 300 |
| Imipramine | 385 | 412 |
| Amitriptyline | 126 | 280 |
| Benztropine | 70 | 75 |

We claim:

1. A 3-substituted 4-phenylpiperidine of the formula

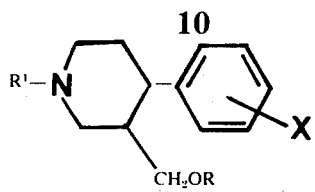

wherein:
R represents alkyl of 1–4 carbon atoms; alkynyl of 2–4 carbon atoms; phenyl; phenyl substituted by alkyl of one to four carbon atoms, alkoxy of one to four carbon atoms, alkylthio of one to four carbon atoms, halogen, nitro, acetylamino, methylsulfonyl, or by methylenedioxo; or tetrahydronaphthyl;

R$^1$ represents hydrogen; alkyl of 1–4 carbon atoms; alkynyl of 2–4 carbon atoms; or 2,2,2-trifluoroethyl;

X represents hydrogen; alkyl or 1–4 carbon atoms; trifluoromethyl; methoxy; halogen; hydroxy; methylthio; or benzyloxy;

and a salt thereof with a pharmaceutically acceptable acid.

2. A compound according to claim 1, in which R is phenyl.

3. A compound according to claim 1, in which R is 4-methoxyphenyl.

4. A compound according to claim 1, in which R is 1,3-benzdioxolyl.

5. The compound according to claim 1, in which R is phenyl, R$^1$ is methyl, and X is hydrogen.

6. The compound according to claim 1, in which R is 4-methoxyphenyl, R$^1$ is methyl, and X is hydrogen.

7. The compound according to claim 1, in which R is 1,3-benzdioxolyl-5, and R$^1$ and X are hydrogen.

8. The compound according to claim 1, in which R is 1,3-benzdioxolyl-5, R$^1$ is methyl, and X is hydrogen.

* * * * *